(12) United States Patent
Mori (10) Patent No.: US 7,992,092 B2
(45) Date of Patent: Aug. 2, 2011

(54) INFORMATION PROCESSING APPARATUS, CONTROL METHOD FOR SAME, PROGRAM, AND STORAGE MEDIUM

(75) Inventor: Shigeki Mori, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 11/873,678

(22) Filed: Oct. 17, 2007

(65) Prior Publication Data

US 2008/0104536 A1     May 1, 2008

(30) Foreign Application Priority Data

Oct. 27, 2006   (JP) .................................. 2006-292708

(51) Int. Cl.
    *G06F 3/048*     (2006.01)
    *G06F 7/00*     (2006.01)
    *G06F 17/30*     (2006.01)

(52) U.S. Cl. ........ 715/769; 715/765; 715/846; 707/722; 707/737; 707/754

(58) Field of Classification Search .................. 707/754, 707/722, 737; 715/769, 775, 767, 765, 740, 715/846, 835
See application file for complete search history.

(56) References Cited

U.S. PATENT DOCUMENTS

| | | | | |
|---|---|---|---|---|
| 5,751,286 A * | 5/1998 | Barber et al. | ................. | 715/835 |
| 5,754,179 A * | 5/1998 | Hocker et al. | ................. | 715/835 |
| 5,774,119 A * | 6/1998 | Alimpich et al. | ............. | 715/764 |
| 5,838,317 A * | 11/1998 | Bolnick et al. | ................ | 715/764 |
| 5,886,698 A * | 3/1999 | Sciammarella et al. | ...... | 715/769 |
| 6,317,739 B1 * | 11/2001 | Hirata et al. | ........................ | 1/1 |
| 7,080,328 B1 * | 7/2006 | Sawyer | ......................... | 715/853 |
| 7,117,453 B2 * | 10/2006 | Drucker et al. | ............... | 715/833 |
| 7,162,488 B2 * | 1/2007 | DeVorchik et al. | ................... | 1/1 |
| 7,231,609 B2 * | 6/2007 | Baudisch | ..................... | 715/769 |
| 7,409,644 B2 * | 8/2008 | Moore et al. | .................. | 715/774 |
| 7,437,005 B2 * | 10/2008 | Drucker et al. | ............... | 382/224 |
| 7,509,321 B2 * | 3/2009 | Wong et al. | ............................. | 1/1 |
| 7,627,831 B2 * | 12/2009 | Chiu et al. | .................... | 715/767 |
| 7,743,059 B2 * | 6/2010 | Chan et al. | .................... | 707/737 |
| 7,770,125 B1 * | 8/2010 | Young et al. | .................. | 715/764 |
| 2002/0080180 A1 * | 6/2002 | Mander et al. | ................ | 345/769 |
| 2005/0188326 A1 * | 8/2005 | Ikeda | ............................. | 715/788 |
| 2005/0192924 A1 * | 9/2005 | Drucker et al. | .................... | 707/1 |
| 2006/0209089 A1 | 9/2006 | Date | ............................. | 345/632 |

FOREIGN PATENT DOCUMENTS

| | | |
|---|---|---|
| CN | 1822643 A | 8/2006 |
| EP | 0 694 857 A1 | 1/1996 |
| JP | 8-44759 A | 2/1996 |
| JP | 8-339375 A | 12/1996 |
| JP | 2003-345829 A | 12/2003 |

\* cited by examiner

*Primary Examiner* — Tadeese Hailu
*Assistant Examiner* — Nicholas Ulrich
(74) *Attorney, Agent, or Firm* — Fitzpatrick, Cella, Harper & Scinto (57) ABSTRACT

An information processing apparatus includes a display unit configured to display a plurality of objects, a first movement unit configured to move one or more of the plurality of objects to one or more movement destination areas on the display unit in response to a user's operation, a determination unit configured to determine an extractive selection condition from incidental information of the object moved by the first movement unit, an extractive selection unit configured to select one or more from among the plurality of objects based on the extractive selection condition determined by the determination unit, and a second movement unit configured to move, to the movement destination area, one or more objects selected by the extractive selection unit.

4 Claims, 11 Drawing Sheets

| ITEM NAME | DATA |
|---|---|
| KIND OF CONTENT ITEM | MOVING-IMAGE CONTENT ITEM |
| GENRE | JOB |
| DATE/TIME OF CREATION | 10/10/2005 |
| EQUIPMENT USED FOR CREATION | MOVIE CAMERA Z |

INFORMATION PROCESSING APPARATUS, CONTROL METHOD FOR SAME, PROGRAM, AND STORAGE MEDIUM

BACKGROUND OF THE INVENTION

1. Field of the Invention

The present invention relates to an information processing apparatus, a control method for the same, a program, and a storage medium. More particularly, the present invention relates to an information processing apparatus and a control method for the same, which can set an information extraction condition and an information exclusion condition with a UI operation input by a user for icon data. Further, the present invention relates to a program and a storage medium for use with the information processing apparatus and the control method.

2. Description of the Related Art

Hitherto, in an information extraction apparatus configured to extract desired data from among a lot of data, necessary information has been extracted by designating an information keyword which is directly included in the desired data, or by designating an information keyword which is included in various metadata associated with the desired data.

When the information keyword is directly included in the desired data, it is given as an arbitrary keyword. Also, when the information keyword is included in various metadata, it is given as an arbitrary or preset keyword depending on the kind of metadata designated.

Further, when a plurality of information keywords are designated from among many information keywords in the metadata, information extraction with point rating is also practiced in consideration of, e.g., weights assigned to the individual information keywords. Thus, in order for a user to extract information from a lot of data with high efficiency, it is important to perform proper selection of the information keyword, proper classification of information, and proper weight assignment.

The following several techniques have been disclosed so far to allow the user to perform the proper selection of the information keyword, the proper classification of information from an optimum viewpoint, and the proper weight assignment.

Japanese Patent Laid-Open No. 2003-345829 proposes a technique of automatically extracting labels which are used to narrow down an initial search result, and presenting the labels to users.

Even when a user is not previously acquainted with information regarding what labels serve as information keywords, the user can efficiently narrow down the search by selecting the proper one of the labels. Also, by repeating proper selection of the label, the user can obtain the desired information.

Japanese Patent Laid-Open No. 08-044759 proposes a technique as follows. When a user views data that is a target of retrieval, the data is displayed in accordance with a classification viewpoint which is previously prepared depending on the data. At that time, when the user changes the classification viewpoint from one to another, the classified search result is displayed in a dynamically changing way depending on respective viewpoints.

Accordingly, the user can narrow down the target data in a short time by efficiently selecting the proper viewpoint while successively changing the viewpoints. In addition, the user can be provided with a new viewpoint that has not been taken or managed by the user up to that time.

Japanese Patent Laid-Open No. 08-339375 proposes a technique as follows. When a retrieval request item is input as a retrieval keyword, retrieval target items are selected based on comparison between the input retrieval request item and the retrieval target items and are displayed such that the retrieval target items are arrayed with the closest one, in terms of the degree of its similarity or similarities to the retrieval request item, located at a center.

Further, when one retrieval target item which is regarded as an unnecessary retrieval result is moved away from the closest retrieval target item located at the center, other items having similarities relatively closer to the retrieval target item that has been moved away are also moved away from the center in ways that depend on their respective similarities to the moved retrieval target item. Consequently, unnecessary retrieval results are displayed farther away from the closest retrieval target item, thus allowing the user to more easily select one or more objective items only.

Meanwhile, at the homes of today, the amount of image content data is rapidly increasing and the demand for extraction of desired information from the great amount of image content data available is also increasing at the same time. The image content data is sufficiently associated with metadata for information extraction, such as shooting data/time and shooting equipment.

When a user finally extracts the objective image content data, the extraction is often performed by utilizing not only the above-described information keywords, but also thumbnail information representing a summary of the content, i.e., a visual search by the user.

In the above-described information extraction apparatus, however, proper extraction of the information demanded by the user cannot be realized unless proper information keywords are selected and appropriately combined with each other. Further, even when information is extracted, a very large number of hits may result in many cases. In addition, if information keywords are erroneously selected, the objective information demanded by the user cannot be obtained in many cases even when the information is extracted in proper number.

With the technique described in Japanese Patent Laid-Open No. 2003-345829, labels presentable to the user are automatically extracted. However, selection of the label fails, for example, when the relationship between the respective labels and data corresponding thereto is not definite to the user, or when a large number of labels are presented to the user. Another problem is that the automatically extracted label corresponds simply to the presence or absence of the information keyword, and a parameter corresponding to a metadata item cannot be designated.

With the technique described in Japanese Patent Laid-Open No. 08-044759, when the user does not have a definite viewpoint for narrowing down the target data, data extraction based on narrowing-down cannot be efficiently performed and the objective data cannot be extracted in some cases. As with the foregoing technique, another problem is that the presented viewpoint corresponds to the presence or absence of the information keyword and a parameter corresponding to a metadata item cannot be designated.

With the technique described in Japanese Patent Laid-Open No. 08-339375, the result of a user's operation of moving one item is given as movements of other associated items depending on the similarities, which however are unknown to the user. Also, the distances through which the other items are moved are determined such that the user can more easily view those items. In other words, the user's operation of moving the item, although it affects the location of other items, is still not a meaningful operation such as designating a parameter, in terms of the user being able to exercise a high degree of control of the search by this means.

Another problem is that, because the item positions currently displayed depend on the similarities, the items are moved in directions in a way that may differ from the feeling of the user who has moved the item. Further, when the user visually searches, e.g., image contents while viewing thumbnails, the visual search is very inefficient if there are a large number of thumbnails.

SUMMARY OF THE INVENTION

In view of the above-described problems with the related art, the present invention provides an information processing apparatus and a control method for an information processing apparatus in which, without requiring a user to be intentionally aware of incidental information of content, metadata incidental to the content can be set as a condition for information extraction. The present invention also provides a program in a computer-readable medium for use with the information processing apparatus and the control method.

According to a first aspect of the present invention, an information processing apparatus includes a display unit configured to display a plurality of objects corresponding respectively to a plurality of content items, a first movement unit configured to move one or more of the plurality of objects to one or more movement destination areas on the display unit in response to a user's operation, a determination unit configured to determine an extractive selection condition from incidental information of the content item corresponding to the object moved by the first movement unit, an extractive selection unit configured to select one or more from among the plurality of objects based on the extractive selection condition determined by the determination unit, and a second movement unit configured to move, to the movement destination area, one or more objects selected by the extractive selection unit.

According to a second aspect of the present invention, a control method for an information processing apparatus includes the steps of displaying, on a display unit, a plurality of objects corresponding respectively to a plurality of content items, moving one or more of the plurality of objects to one or more movement destination areas on the display unit in response to a user's operation, determining an extractive selection condition from incidental information of the content item corresponding to the object moved in the aforementioned content moving step, selecting one or more from among the plurality of objects based on the extractive selection condition determined in the determining step, and moving, to the movement destination area, one or more objects selected in the selecting step.

According to a third aspect of the present invention, an information processing apparatus includes a display unit configured to display content items of which summaries are represented by icons, an operating unit configured to move the content item on the display unit, and an information extractive selection unit configured to select one or more content items from among a content item group based on an extractive selection unit. The information processing apparatus further includes an extractive condition determination unit configured to determine the extractive selection condition for the information extractive selection unit based on both incidental information of a particular content item that has been moved and information of a content item movement destination.

According to the present invention, without requiring a user to know incidental information of a content item, metadata incidental to the content item can be used as a condition for information extraction by moving an icon corresponding to the content item.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DESCRIPTION OF THE EMBODIMENTS

It is to be noted that, although exemplary embodiments of the present invention will be described below with reference to the drawings, the following exemplary embodiments are given merely by way of example and are not intended to limit the scope of the present invention.

First to fourth exemplary embodiments of the present invention are described in detail with reference to the drawings.

First Exemplary Embodiment

Figure 1:
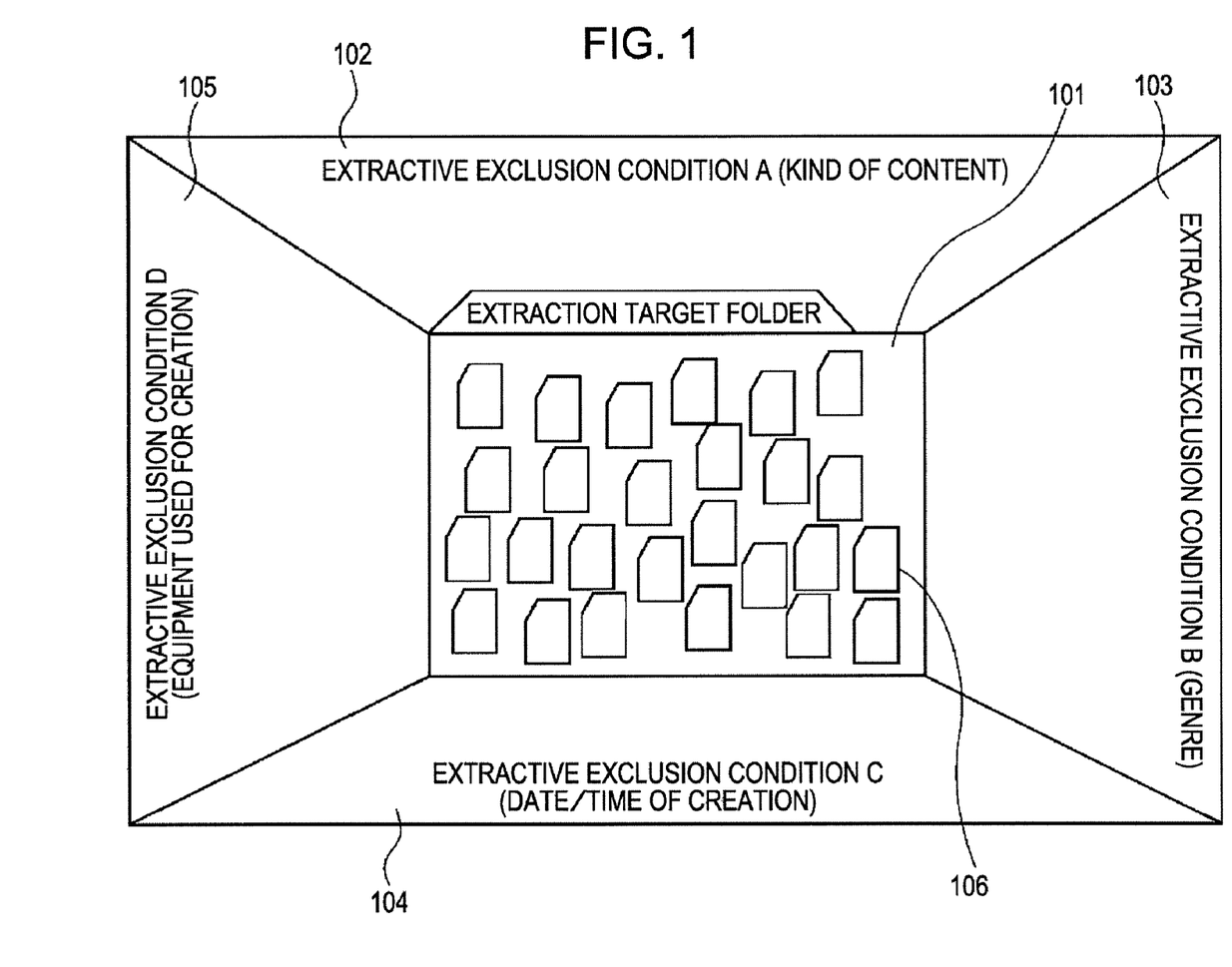
FIG. 1 illustrates a display UI screen presented when an operation for information extractive selection is performed in an information extraction apparatus as a practical example of an information processing apparatus according to a first exemplary embodiment of the present invention.

FIG. 1 illustrates a display UI screen presented when an operation for information extractive selection is performed in an information extraction apparatus as practical one of an information processing apparatus according to a first exemplary embodiment of the present invention.

Referring to FIG. 1, a folder 101 for storing targets of information extraction serves as a place where a content group 106 is stored as an initial population for which the information extraction is executed according to the present invention. Individual sets or items of content are displayed in the folder 101 in the form of representative icons indicating respective summaries of the contents. Hereinafter, objects such as image data, moving image data, music data, and document files will be referred to as "content".

Stated another way, in the first exemplary embodiment, an extraction operation performed on an icon is equivalent to an extraction operation performed on the corresponding content. The term "population" means a set which definitely includes particular content demanded by a user. Herein, the population is a content set including icons in such a number as do not allow the user to easily specify the desired icon by a visual search of the icons.

The content group 106 constituting the population can be a content group resulting from some primary extraction previously executed in this system, or all contents stored in this system. The display UI screen, shown in FIG. 1, displays thereon extractive exclusion condition designating areas 102-105 which are prepared to designate different extractive exclusion conditions A to D.

Figure 2:
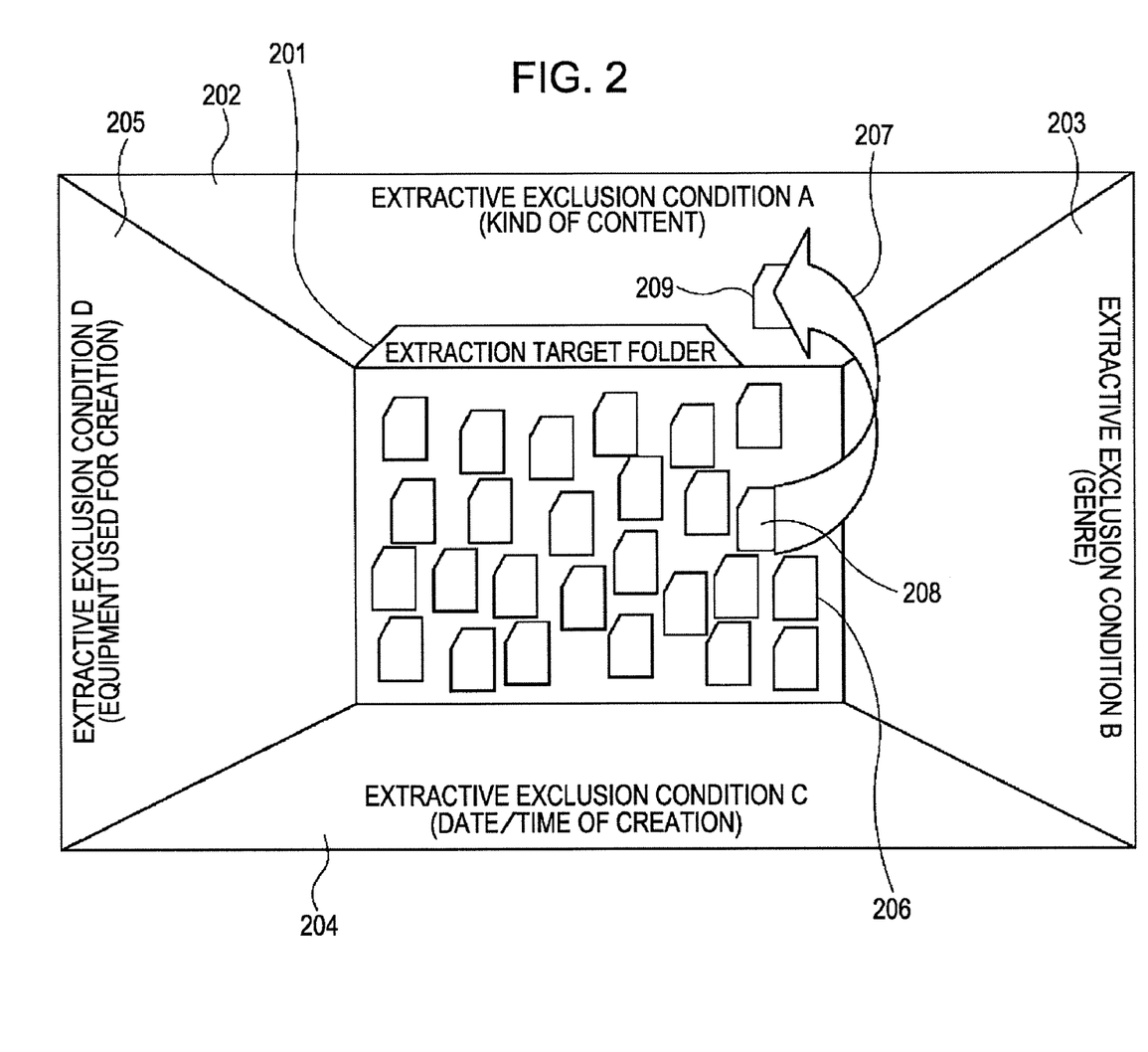
FIG. 2 illustrates the operation for information extractive selection performed on the display UI screen of FIG. 1.

FIG. 2 illustrates the extractive selection operation executed on the display UI screen of FIG. 1.

More specifically, with reference to FIG. 2, the following description is given of operations of selecting, from the extraction target folder, content as a target of the extractive exclusion condition with a content moving operation by the user, and of designating the kind of the extractive exclusion condition from among incidental information of the selected content.

Referring to FIG. 2, content item 208 selected from the extraction target folder by the user is content having information differing from that of the content which the user is seeking to extract from the extraction target folder. FIG. 2 also shows an imaginary arrow 207 representing the content moving operation performed by the user (that is, arrow 207 is shown for purposes of explanation, and is not actually present in the UI), and content item 209 consequently is displayed after the user has moved the selected content item 208 to an extractive exclusion condition area 202 (see below).

From among the content items displayed in the extraction target folder, the user selects the content item 208 to be excluded. Then, the user moves the selected content item 208 to an area 202, which is provided to enable the user to designate information that is to be set as an extractive exclusion condition from among the incidental information of the selected content items 208. The user's movement of a content item from area 201 to area 202 designates that item as no longer being a target, and the system treats the incidental information of that content item as defining an exclusion condition, and on the basis of that exclusion condition, automatically also moves to area 202 other content items having sufficiently similar incidental information. Specifically, movement of the content item to area 202 indicates that the item is being excluded based on the nature of its content, and accordingly the other content items moved to area 202 by the system are those whose incidental information indicates a similar kind of content. Movement of a content item by the user to area 203, 204 or 205 would instead cause the system to use that content item's genre, date/time of creation or equipment used, respectively, as the basis for automatically moving additional content items to that same area.

Reference numerals 201-206 in FIG. 2 correspond to 101-106 in FIG. 1, respectively. (This is applicable to FIG. 3 and subsequent drawings described below, as well).

Figure 3:
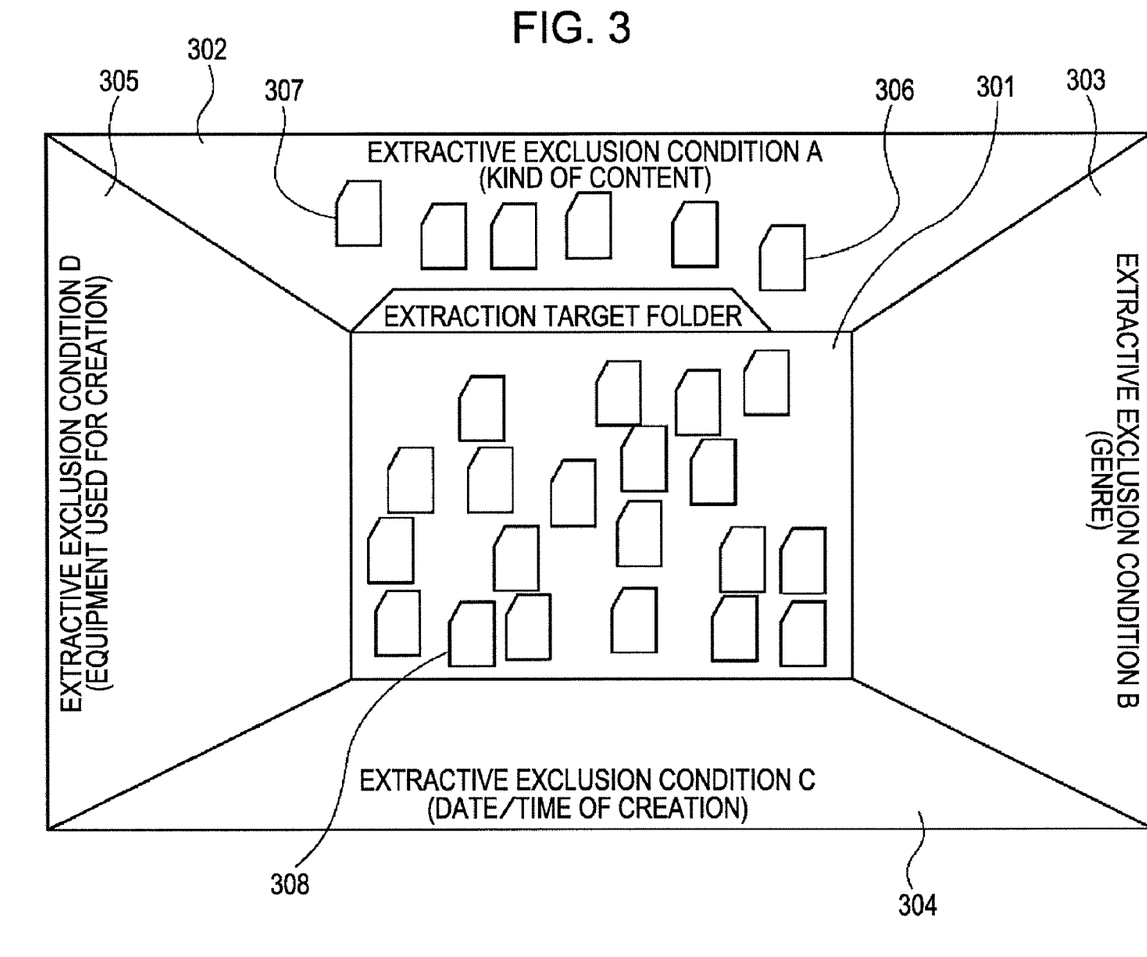
FIG. 3 illustrates the result (No. 1) of the extractive selection operation in FIG. 2.

FIG. 3 illustrates the result (No. 1) of the extractive selection operation in FIG. 2.

Content item 306 shown in FIG. 3 is content which has been moved by the user. Other items of content 307 than content item 306, which are located in area 302, are content items which have been moved to area 302 by a later-described operation according to this first exemplary embodiment, upon the completion of the content moving operation illustrated in FIG. 2.

Figure 4:
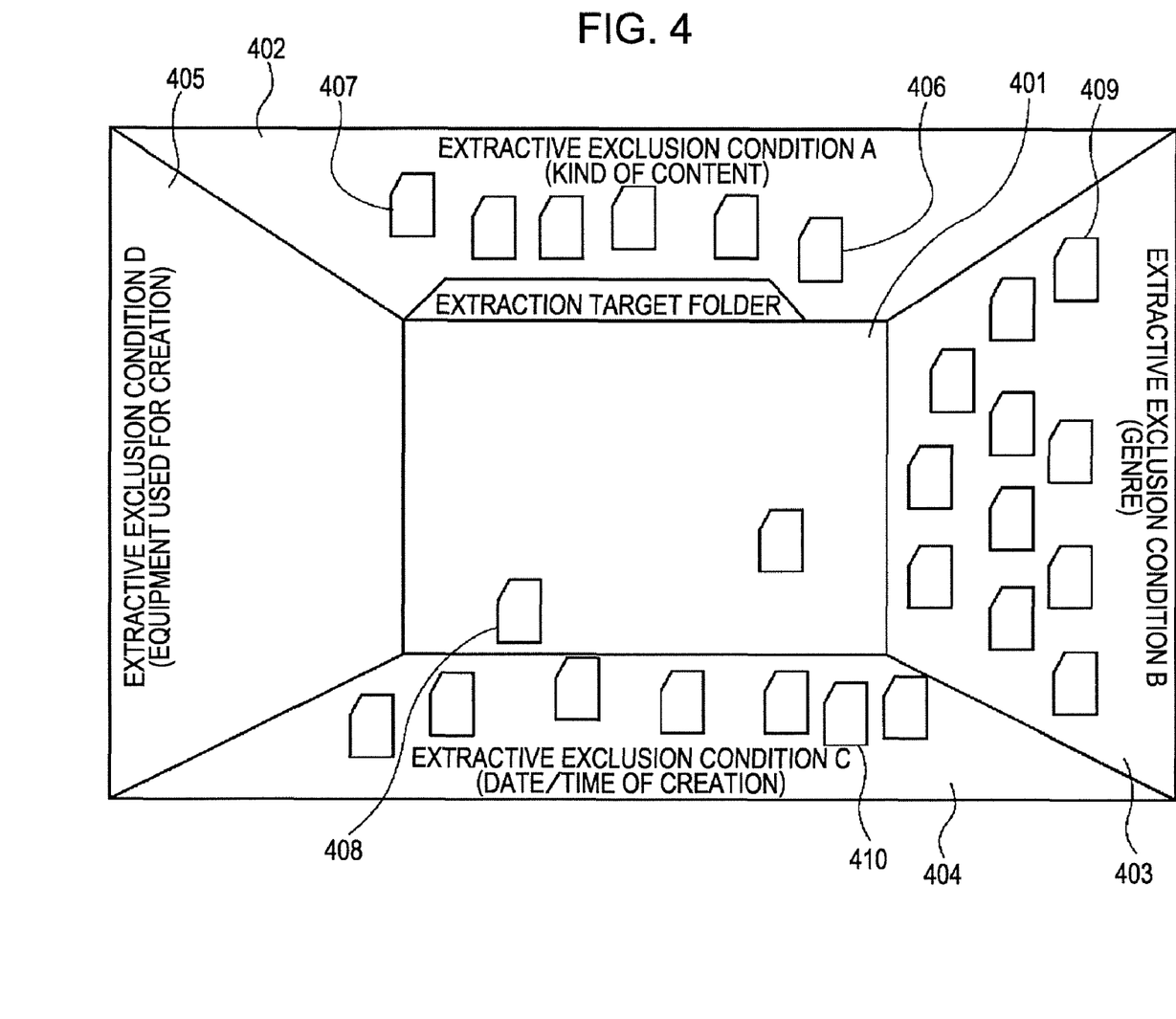
FIG. 4 illustrates the result (No. 2) of the extractive selection operation in FIG. 2.

FIG. 4 illustrates the result (No. 2) of the extractive selection operation in FIG. 2.

More specifically, FIG. 4 illustrates the result of executing the selection of the extractive exclusion target and the designation of the extractive exclusion condition, which are described above with reference to FIGS. 2 and 3, as an operation of moving some content from an extraction target folder 401 to one of the extractive exclusion condition designating areas 402-404, and repeating such an operation three times.

Thus, in a state shown in FIG. 4, because the number of content items remaining after the exclusion of the unrelated contents from the extraction target folder is very small, the user can now easily select the objective content.

Figure 5:
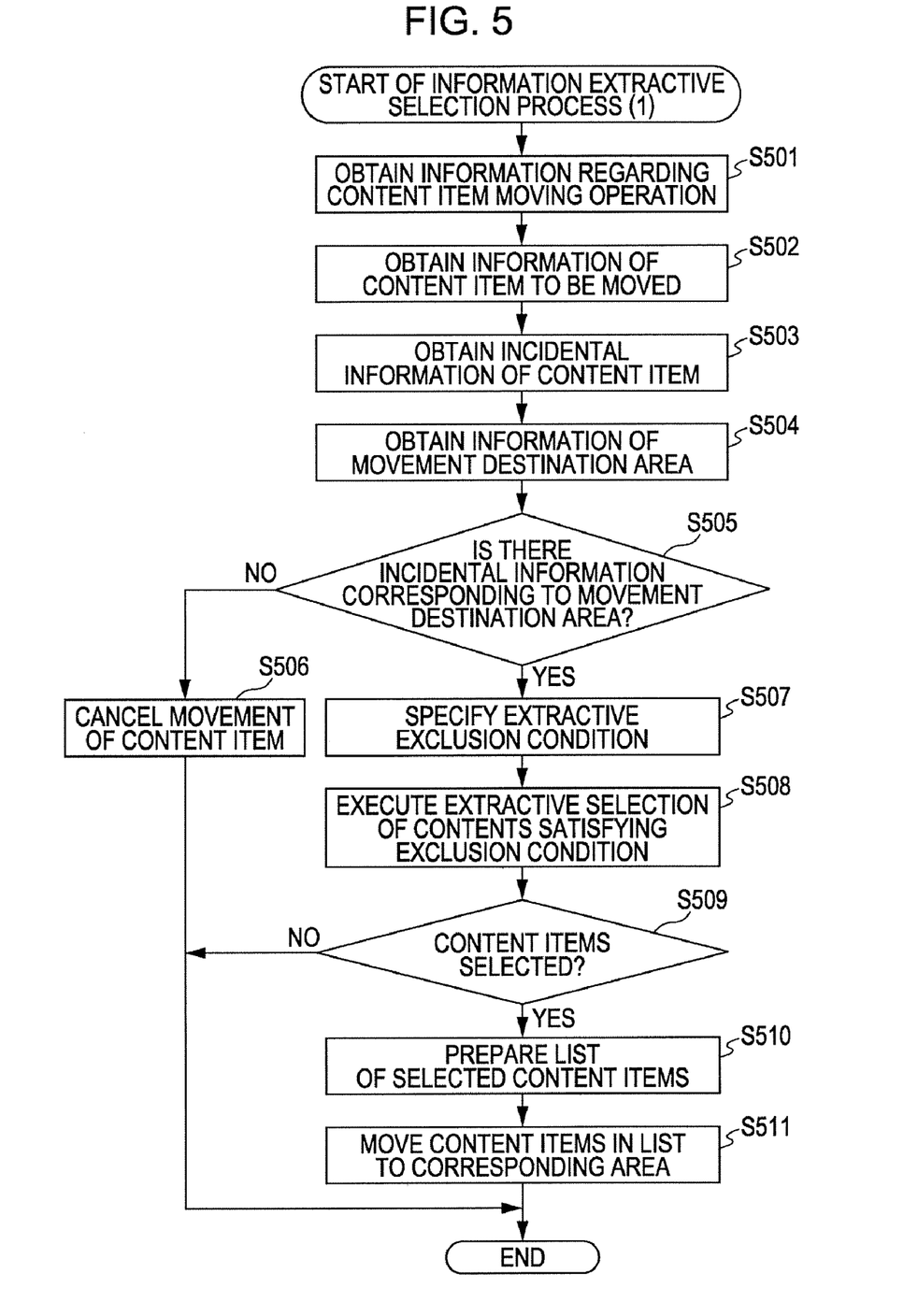
FIG. 5 is a flowchart showing steps of an information extractive selection process executed by the information processing apparatus according to the first exemplary embodiment of the present invention.

FIG. 5 is a flowchart showing steps of an information extractive selection process executed by the information processing apparatus according to the first exemplary embodiment of the present invention.

The process shown in FIG. 5 is started when the user performs the operation of moving an item of content out of the extraction target folder. First, information regarding the content moving operation is obtained (step S501). Then, other necessary information is also obtained from the content item moved by the content moving operation, including information identifying which item has been moved, the incidental information of that item, and which area it has been moved to (step S502-step S504).

Next, it is determined whether the incidental information of the moved content item includes information of a type corresponding to the type or kind of condition or parameter to which the extractive exclusion condition designating area which is the destination of the moved content relates (step S505). Thus, if the item has been moved to area 202, step S505 involves determining whether the item's incidental information includes information identifying the item's content. If the moved content item's incidental information does not include information of the kind to which the movement designation area corresponds, the processing advances to step S506, in which the content moving operation is itself canceled, and the processing is brought to an end.

If it is determined in step S505 that the moved content item's incidental information includes information of the kind to which the movement designation area relates, the processing advances to step S507. In step S507, the user specifies the incidental information corresponding to the kind of the extractive exclusion condition, which is included in the content. Based on the specified incidental information, extractive selection of content items satisfying the extractive exclusion condition is executed from among the content items that are still displayed in the extraction target folder (step S508).

Next, it is determined (in step S509) whether one or more content items have been selected by the extractive selection in step S508. If none have been selected, the processing is brought to an end. If one or more content items are selected, however, a list of those content items is prepared based on the result of the extractive selection to specify the content items to be moved (step S510). Subsequently, the specified content items in the list are moved to the extractive exclusion condition designating area corresponding to the designated extractive exclusion condition (step S511). The processing is then brought to an end.

Figure 6:
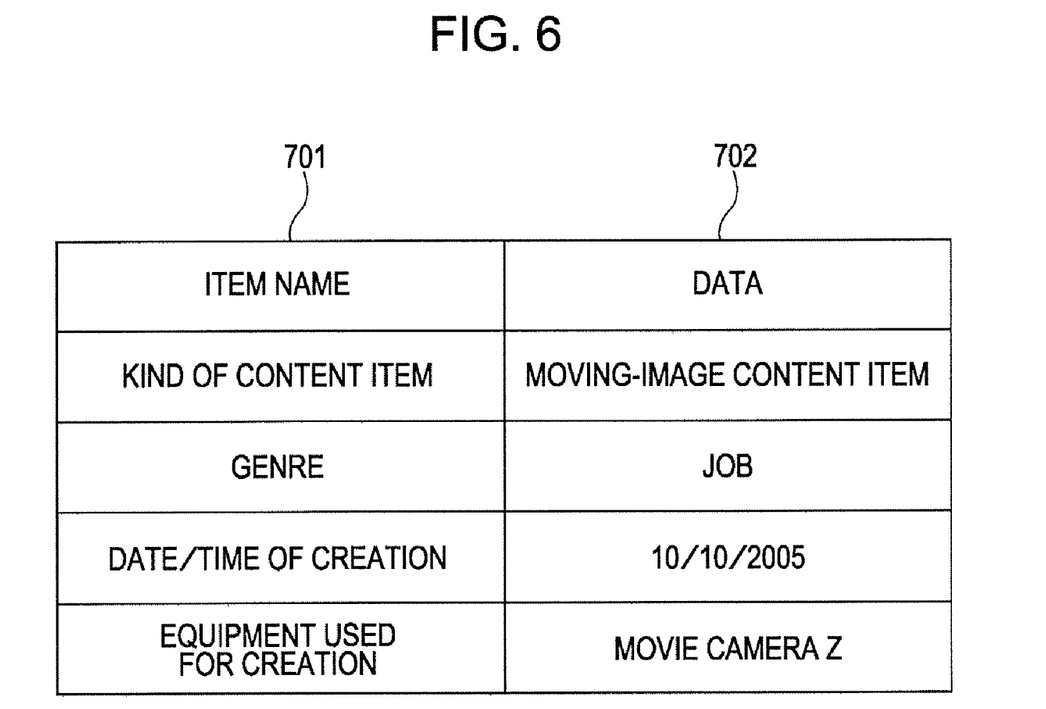
FIG. 6 is a table showing incidental information of content used in the information processing apparatus according to the first exemplary embodiment of the present invention.

FIG. 6 is a table showing the incidental information of the content used in the information processing apparatus according to the first exemplary embodiment of the present invention.

In FIG. 6, reference numeral 701 denotes an item name of incidental data, and 702 denotes data corresponding to the item name. The content includes, as individual items of the incidental data, information regarding the kind of content, genre, date/time of creation, and equipment used for creation.

The first exemplary embodiment will be described in more detail with reference to FIGS. 1-6.

In the display UI screen of the information extraction apparatus shown in FIG. 1, the contents in the form of icons, the folder, and other various discernable areas are displayed in accordance with a window system not described here in detail. Also, on the display UI screen, the content items, represented by icons, can be moved by the user operating a pointing device.

In order to search for particular content, the user previously extracts a content item group that the user can be certain includes the particular content and stores the content item group in the extraction target folder 101 in FIG. 1. The content item group is displayed on the display UI screen as icons representing respective summaries of the content items in the group.

By way of example, it is here assumed that, on the display UI screen of FIG. 1, the user searches for content of private photos which were taken several years ago. For that purpose, the user extracts only image content items from among all information held in the information extraction apparatus, and stores the extracted image content items in the extraction target folder. In other words, content items that plainly differ from the objective content, e.g., document data, are already excluded in this step.

Because the content items located in the extraction target folder of FIG. 1 are displayed in the form of icons, the user can confirm respective summaries of those content items on the display UI screen. From among the content items located in the extraction target folder, the user visually selects an icon which plainly differs from the content to be searched for.

In FIG. 2, judging from the user's certain memory, an attention-paid icon (content item) 208, for example, is apparently moving-image content while the content being searched for by the user is photo content. Thus, the user determines that the content in question can be excluded from the extraction target with certainty.

Then, the user selects the kind of content, to discriminate photo data content items from moving image data content items based on the incidental information of the content in question. In other words, the user makes a determination to exclude content item 208 from the extraction target folder 201 and moves content item 208 to area 202, to designate the kind of content present in that item as an extractive exclusion condition for excluding other content items of the same kind.

At that time, in the information extraction apparatus, the process shown in FIG. 5 is started upon detection of the content item movement from the extraction target folder to the extractive exclusion condition designating area.

In the flowchart of FIG. 5, the processing is started from step S501 in response to the content item moving operation by the user. In step S501, the information regarding the content item moving operation is obtained. In steps S502 and S503, the information of the content item 208 itself and the incidental information of the content item 208 are obtained, respectively. FIG. 6 represents, in the form of a table, the incidental information of the content item 208.

In step S503, the "kind of content" is obtained as the extractive exclusion condition, i.e., the information representing the movement destination of the content item 208. In step S505, it is determined whether the item "kind of content" is included in the incidental information of the content item 208. Herein, since the incidental information of the content item 208 includes the item "kind of content", the processing advances to step S507.

In step S507, "moving-image content", i.e., data of the content item 208 corresponding to the item "kind of content" in FIG. 6, is specified as an extractive exclusion condition. In step S508, content items including "moving-image content" in the "kind of content" incidental information thereof are selected from among the content items located in the extraction target folder 201.

In step S509, it is determined whether one or more content items are selected. Herein, since several content items are selected, a list of the selected content items is prepared in step S510. In step S511, the content items in the list are moved to the extractive exclusion condition designating area 202. The processing is then brought to an end.

FIG. 3 illustrates the display UI screen of the information extraction apparatus after the processing of FIG. 5 has been completed. In FIG. 3, several content items having been located in an extraction target folder 301 so far are moved to an extractive exclusion condition designating area 302. Subsequently, the user can repeat the operation of selecting, from among the content items remaining in the extraction target folder 301, some that differ from the objective content and move them to another extractive exclusion condition designating area in a similar manner.

For example, another content item, having for the incidental information item "genre" something other than "private", can be moved to an extractive exclusion condition designating area 303, and still another content item, having the incidental information item "date/time of creation" apparently older than that of the target content being sought, can be moved to extractive exclusion condition designating area 304. Whenever each of those content items is moved to the corresponding area, the processing of FIG. 5 is executed and content items each having the same incidental information of the relevant type (e.g., genre or date) as the moved content item, are also moved to the corresponding area.

FIG. 4 illustrates the display UI screen of the information extraction apparatus after the above-described content item moving operation has been repeated. In other words, the user can easily select the objective content by repeating the above-described content item moving operation and obtaining the result shown in FIG. 4.

According to the first exemplary embodiment, as described above, by repeating the content item moving operation as illustrated in FIGS. 2 and 3, the content items each having the same condition as that of the excluded content can also be simultaneously excluded from the extraction target folder.

In other words, it is possible efficiently and easily to reduce the number of content items displayed in the extraction target folder and thus to realize a state where just a few content items are displayed in the extraction target folder, as shown in FIG. 4. In such a state, the user can easily find the desired content item even with just a visual search.

Second Exemplary Embodiment

In the first exemplary embodiment described above, the number of content items displayed in the extraction target folder can be efficiently reduced by moving those content items that can be apparently excluded from the extraction target at the user's discretion, to one or another of the extractive exclusion condition designating areas. However, the system configuration can be modified, contrary to the first exemplary embodiment, so as to add an extraction condition for selecting content items to be returned to the extraction target folder.

The following description of the second exemplary embodiment is given on the assumption that a content item that should not have been moved out from the extraction target folder has been moved out from there by a user's false operation or misunderstanding, which the user now has realized and wishes to correct.

At a certain point in time, thus, the user finds, in any of the extractive exclusion condition designating areas in FIG. 4, a content item that is very similar to the objective (desired) content and that should not be apparently excluded from the extraction target folder. In such a case, if this situation is not corrected, it is difficult to extract the sought content no matter how many times the user may repeat the operation of moving content items from the extraction target folder to any of the extractive exclusion condition designating areas from the above-described state. To avoid such a difficulty, the second exemplary embodiment enables a content item that is very similar to the objective content, to be moved from the extractive exclusion condition designating area to the extraction target folder.

Figure 7:
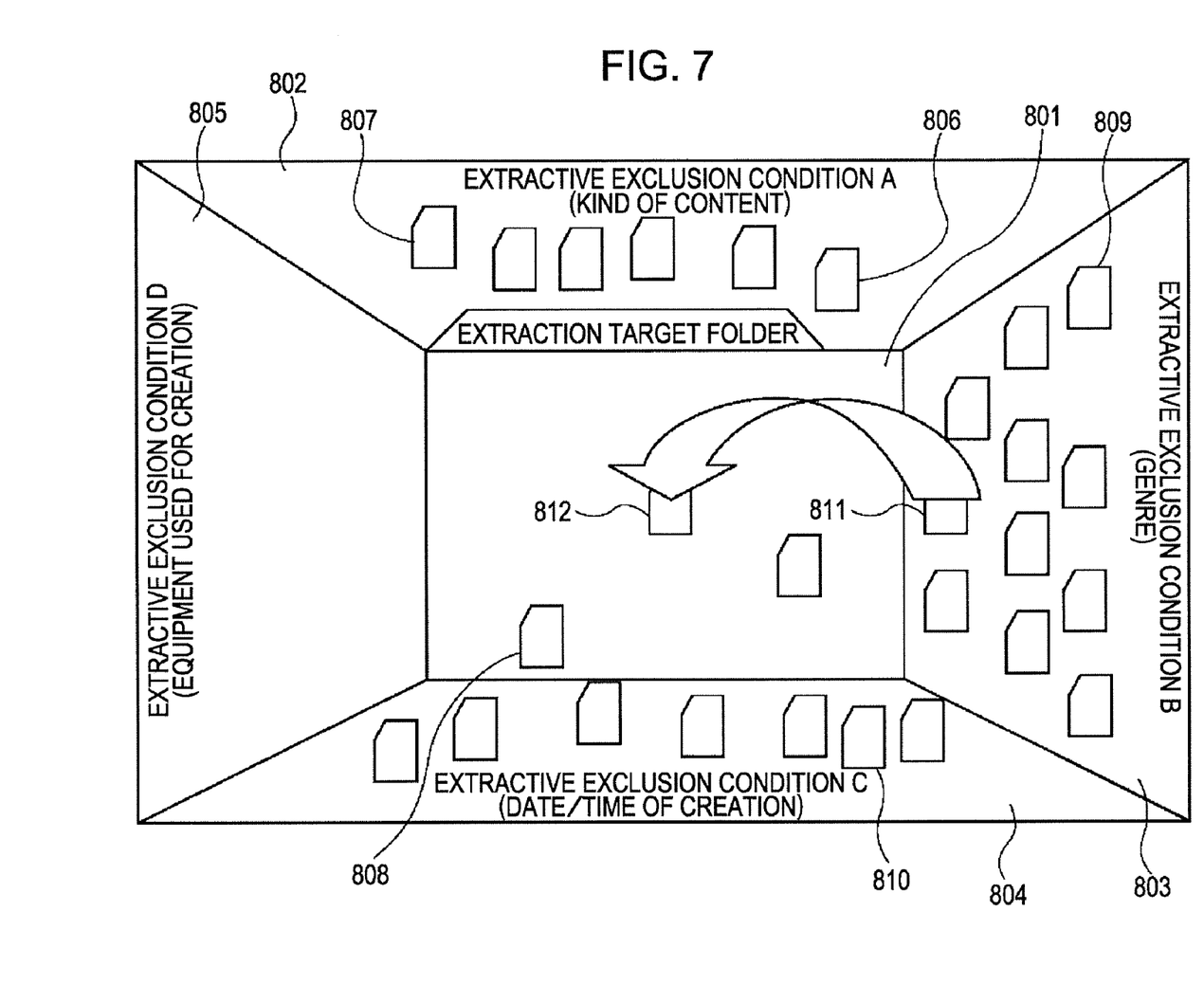
FIG. 7 illustrates an operation for information extractive selection performed in an information processing apparatus according to a second exemplary embodiment of the present invention.

FIG. 7 illustrates an operation for information extractive selection performed in the information processing apparatus according to the second exemplary embodiment of the present invention.

More specifically, FIG. 7 illustrates a display UI screen when the user performs an operation of moving content item 811 located in an extractive exclusion condition designating area to an extraction target folder 801.

Figure 8:
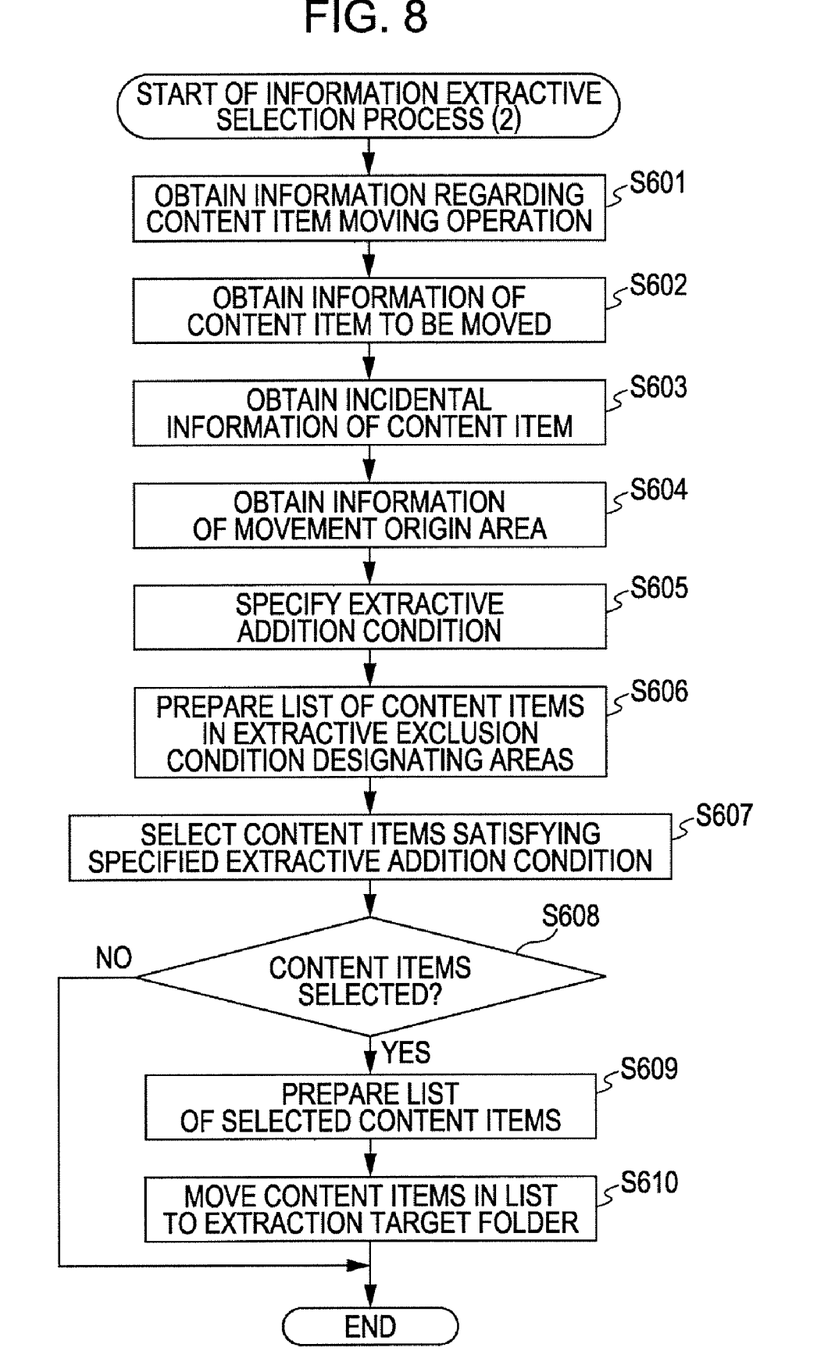
FIG. 8 is a flowchart showing steps of an information extractive selection process executed by the information processing apparatus according to the second exemplary embodiment of the present invention.

FIG. 8 is a flowchart showing steps of an information extractive selection process executed by the information processing apparatus according to the second exemplary embodiment of the present invention.

More specifically, the flowchart of FIG. 8 shows processing executed when the operation of moving the content from the extractive exclusion condition designating area to the extraction target folder is performed which is contrary to the content moving operation described above with reference to FIG. 5.

The processing shown in FIG. 8 is started when the user performs the operation of moving the content item from the extractive exclusion condition designating area to the extraction target folder. First, information regarding the content item moving operation is obtained (step S601). Then, other necessary information is also obtained from the content item moved in the content moving operation (step S602-step S604). The user specifies the incidental information corresponding to the kind of the extractive addition condition that is included in the content item and that corresponds to the movement origin area (step S605), that is, to the extractive exclusion condition designating area in which the content item was located.

Next, a list of all content items located in the movement origin area and the other extractive exclusion condition designating areas is prepared (step S606). From among the prepared list, one or more content items are selected each of which has incidental information corresponding to the relevant kind of the extractive addition condition (step S607). It is then determined whether one or more content items are selected (step S608). If none are selected, the processing is brought to an end.

If one or more content items are selected, a list of those content items is prepared based on the result of the extractive selection to specify the content items to be moved (step S609). Subsequently, the specified content items in the list are moved to the extraction target folder (step S610). The processing is then brought to an end.

Figure 9:
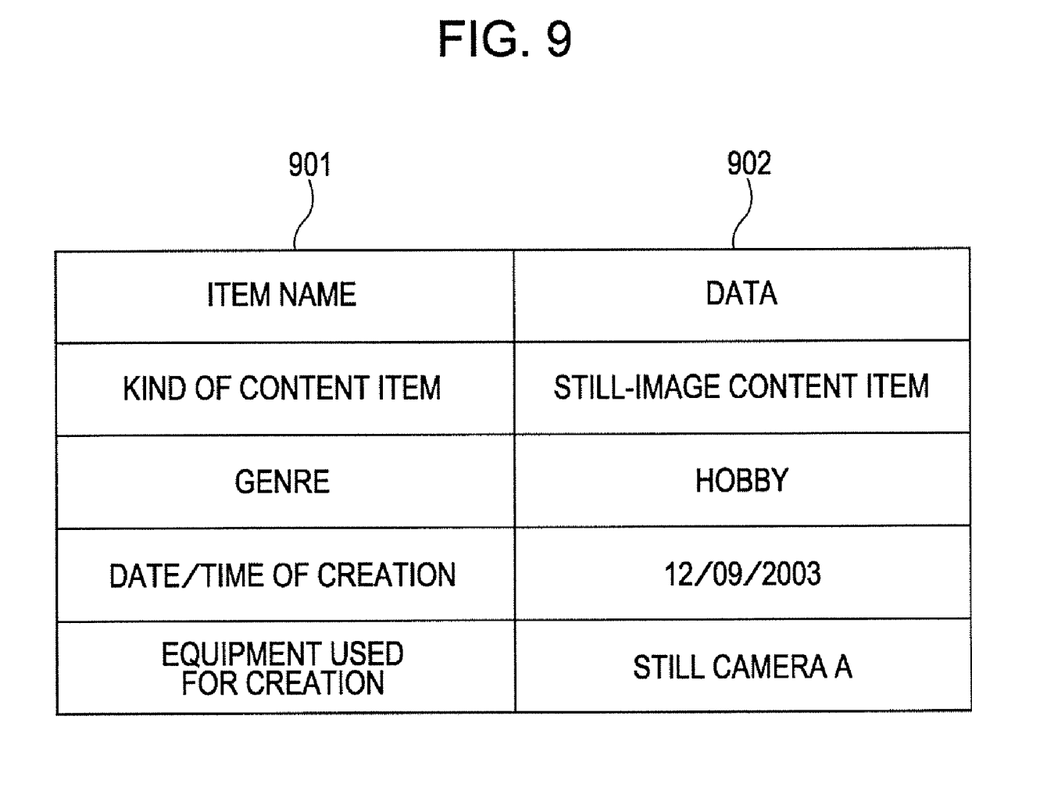
FIG. 9 is a table showing incidental information of content used in the information processing apparatus according to the second exemplary embodiment of the present invention.

FIG. 9 is a table showing the incidental information of the content item used in the information processing apparatus according to the second exemplary embodiment of the present invention.

In FIG. 9, reference numeral 901 denotes an item name or type of incidental data, and 902 denotes data corresponding to the item name 901. The content item includes, as individual items of the incidental data, information regarding the kind of content, genre, date/time of creation, and equipment used for creation.

The second exemplary embodiment will be described in more detail with reference to FIGS. 7-9.

The display UI screen of FIG. 7 is in a state where the operation of moving a content item from the extraction target folder to the extractive exclusion condition designating area has been performed several times and content items are displayed in the extraction target folder in such small number that the user can easily view the content items for a visual search.

It is here assumed that the objective (target) content item to be certainly located in the extraction target folder is not located in the extraction target folder and one or more content items that are very similar to the objective content sought by the user are found in any of the extractive exclusion condition designating areas.

In that state, the user performs the operation of moving the content item(s) that are very similar to the objective content, to the extraction target folder. The content item moving operation actuates startup of the process shown in the flowchart of FIG. 8.

In the flowchart of FIG. 8, the processing is started from step S601 in response to the content item moving operation by the user. In step S601, the information regarding the content item moving operation is obtained. In steps S602 and S603, the information of the content item 811 itself and the incidental information of the content item 811 are obtained, respectively.

FIG. 9 represents, in the form of a table, the incidental information of the content item 811. In step S604, the item "genre" is obtained as the extractive exclusion condition that represents the information of the movement origin area 803 of the content item 811, that is, the area from which the item 811 was moved.

In step S605, data "hobby", corresponding to the item "genre", which has been set as the extractive exclusion condition for the content item 811, is specified as an extractive addition condition for extracting one or more content items and adding them to the extraction target folder 801. In step S606, a list of the content items located in the areas other than the extraction target folder 801 is prepared. In step S607, a content item having the item "genre" "hobby" is selected from among the content items in the list.

In step S608, it is determined whether one or more content items have been selected. If none have been selected, the processing is brought to an end. If it is determined in step S608 that one or more content items are selected, a list of the selected content items is prepared in step S609. In step S610, the content items in the list are moved to the extraction target folder 801.

According to the second exemplary embodiment, even when a content item is moved from the extraction target folder to the extractive exclusion condition designating area erroneously as a result of the user's false operation or misunderstanding, the operation of designating the extractive exclusion condition, which has been performed by the user's false operation or misunderstanding, can be undone for the erroneously designated extractive exclusion condition. Further, by repeating the designation of the extractive exclusion condition and the designation of the extractive addition condition according to the second exemplary embodiment as required, information extraction can be executed with greater flexibility.

In the second exemplary embodiment described above, the list of content items located in all the extractive exclusion condition designating areas is prepared in step S606, and the extractive selection of one or more content items is executed in step S607 based on the list. As an alternative, however, the list can be prepared so as to include content items located only in the extractive exclusion condition designating area in which the content item 811 is displayed.

With such a modification, when the content item moving operation that has been made by the user's false operation or misunderstanding, is related to only one particular extractive exclusion condition designating area, the number of content items returned to the extraction target folder can be reduced and the number of operations required to find the objective content can be cut.

Third Exemplary Embodiment

In the first and second exemplary embodiments described above, the extractive exclusion condition is set using the item name and the corresponding data which are included in the incidental information of the content item, and the extractive selection is performed by determining a match or a mismatch with the set condition.

In a third exemplary embodiment, attention is focused on numerical value information included in the incidental information of the content, and extractive exclusion condition designating areas representing numerical magnitudes are provided such that a numerical range and a numerical ascending/descending direction can be set as the one or more of the conditions.

Figure 10:
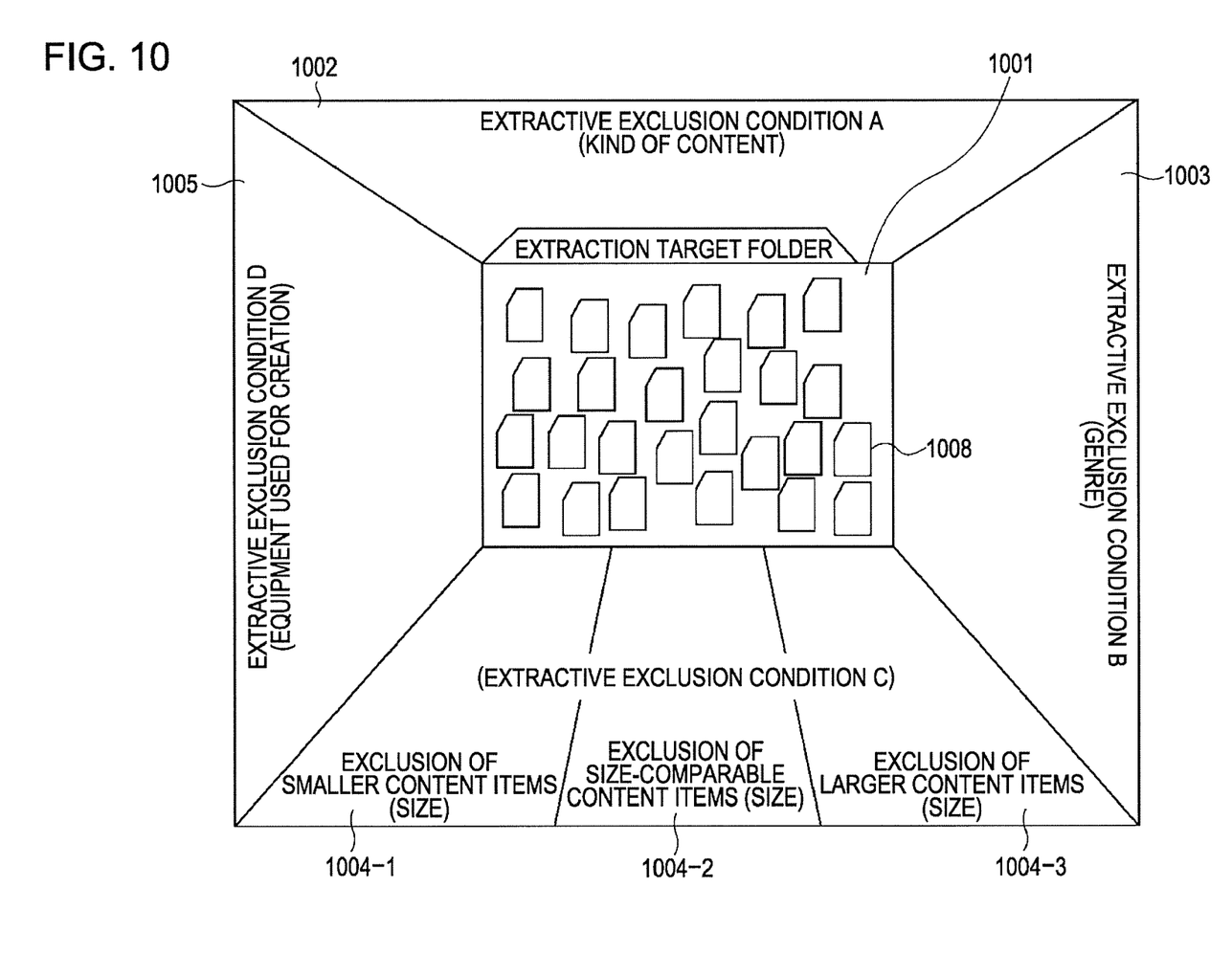
FIG. 10 illustrates a display UI screen presented when an operation for information extractive selection is performed in an information processing apparatus according to a third exemplary embodiment of the present invention.

FIG. 10 illustrates a display UI screen presented when an operation for information extractive selection is performed in an information processing apparatus according to the third exemplary embodiment of the present invention.

As shown in FIG. 10, in an area 1004 prepared to designate a content item size as the extractive exclusion condition, sub-areas (1004-1, 1004-2 and 1004-3) are provided to permit the user to set a numerical condition in comparison with the content item size.

With such an arrangement, the user can set a numerical condition for the content items located in the extraction target folder on the basis of some content item for which the user definitely remembers a size magnitude relation with respect to the objective (target) content, without inputting concrete numerical information.

While in the third exemplary embodiment the content size information is used as the numerical information that gives the extractive exclusion condition, the incidental information of the content item can of course include another suitable item providing a different kind of numerical information. Further, the extractive exclusion condition added in the third exemplary embodiment is not limited to numerical information, and can also be given by a different kind of information so long as information variables can be one-dimensionally classified and the order of those variables can be determined based on preset conditions (in mathematical terms, that is, this can be done so long as the information variable can be provided with a well-ordering).

Fourth Exemplary Embodiment

In the first to third exemplary embodiments described above, the items corresponding to the extractive exclusion condition designating areas set on the display UI screen of the information processing apparatus are set in advance.

In contrast, a fourth exemplary embodiment includes a unit configured to scan particulars of incidental information of each content item in a content item group which has been prepared to be displayed in the extraction target folder by the user at the beginning of a search. Further, the fourth exemplary embodiment includes a unit configured to detect an item of the incidental information which can classify the content item group into large subgroups, and to set the detected item as a designated condition item corresponding to the extractive exclusion condition designating area.

With such an arrangement, the user can efficiently reduce the number of content items located in the extraction target folder by selecting some content item having an item data set as the extractive exclusion condition, that is, one which should be excluded with certainty, and by repeating the selection.

While in each of the above-described exemplary embodiments the extractive exclusion condition designating areas are arranged in four directions about the extraction target folder at a center, the invention also includes arrangements in which more or fewer than four extractive exclusion condition designating areas are provided.

Further, another extraction target folder including extractive exclusion condition designating areas can be displayed around the existing extraction target folder such that content items can be selected and moved between the folders. With the movement of content items between the folders, the contents in each of the folders can be displayed as a purer or narrower set satisfying more conditions.

Figure 11:
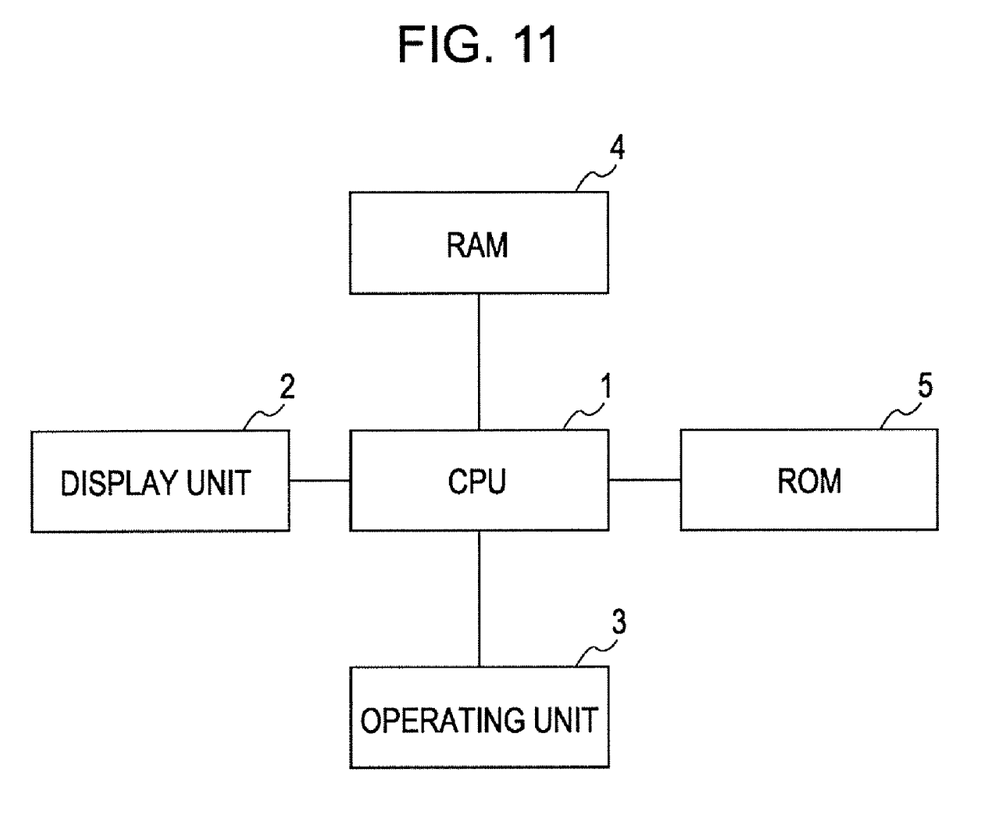
FIG. 11 is a block diagram showing functional blocks of the information processing apparatus according to the present invention.

FIG. 11 is a block diagram showing functional blocks of the information processing apparatus according to the present invention.

Referring to FIG. 11, the information processing apparatus includes a CPU 1, a display unit 2, an operating unit 3, a RAM 4, and a ROM 5, the components 2-5 being connected to the CPU 1. The CPU 1 operates so as to implement functions of various units stated in the claims.

The features of the present invention can also be realized in such a way that a computer (CPU or MPU) in a system or an apparatus reads and executes program code stored in a storage medium. To that end, the storage medium recording the program code of software for implementing the functions of the above-described exemplary embodiments is supplied to the system or the apparatus.

In that case, the program code read out from the storage medium serves in itself to implement the functions of the above-described exemplary embodiments. Therefore, the program code and the storage medium storing the program code also constitute the present invention.

Storage media for supplying the program code can be, for example, a floppy disk, a hard disk, and a magneto-optical disk. Other examples include a CD-ROM, a CD-R, a CD-RW, a DVD-ROM, a DVD-RAM, a DVD-RW, a DVD+RW, a magnetic tape, a nonvolatile memory card, and a ROM. Alternatively, the program code can be downloaded via a network.

Further, the present invention involves a case where an OS (operating system) or the like running in the computer executes a part or the whole of actual processing and the functions of the above-described exemplary embodiments are implemented by the processing executed by the OS or the like. In that case, the OS or the like executes the program code read out by the computer such that the functions of the above-described exemplary embodiments are implemented in accordance with instructions of the program code.

In addition, the present invention involves a case where a CPU or the like, which is incorporated in a function extension board or a function extension unit, executes a part or the whole of actual processing and the functions of the above-described exemplary embodiments are implemented by the processing executed by the CPU or the like. In that case, the program code read out from the storage medium is written in a memory, which is incorporated in the function extension board inserted in the computer or the function extension unit connected to the computer. Thereafter, the functions of the above-described exemplary embodiments are implemented in accordance with instructions of the program code written in the memory.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-292708 filed Oct. 27, 2006, which is hereby incorporated by reference herein in its entirety.

What is claimed is:

1. An information processing apparatus comprising:
a display unit configured to display a plurality of objects, a first area and a second area, wherein the plurality of objects is displayed in the first area and information indicating items of incidental data of the objects is displayed in the second area;
a reception unit configured to receive a user's operation to move one or more of the plurality of objects from the first area to the second area;
a judgment unit configured to judge whether the incidental data of the object(s) moved by the user's operation includes incidental data corresponding to the items of the incidental data of the objects set in the second area;
a cancellation unit configured to cancel the user's operation and to display the object(s) moved by the user's operation not in the second area but in the first area together with objects not moved by the user's operation, in a case where the judgment unit judges that there is no incidental data corresponding to the items of the incidental data of the objects set in the second area in the incidental data of the objects moved by the user's operation;
a determination unit configured to determine one or more objects, among the objects displayed in the first area, whose incidental data corresponding to the items of the incidental data of the objects set in the second area matches the incidental data of the object(s) moved by the user's operation, in a case where the judgment unit judges that there is incidental data corresponding to the items of the incidental data of the objects set in the second area in the incidental data of the object(s) moved by the user's operation; and
a movement unit configured to move the object(s) determined by the determination unit to the second area and display the object(s) in the second area, and to display objects that are not determined by the determination unit in the first area.

2. The information processing apparatus according to claim 1,
wherein there are plural second areas, and
wherein the display unit displays the plural second areas in such a way that the plural second areas are arranged around and adjacent to the first area.

3. A control method for an information processing apparatus, the control method comprising the steps of:
displaying, on a display unit, a plurality of objects, a first area and a second area, wherein the plurality of objects is displayed in the first area and information indicating items of incidental data of the objects is displayed in the second area;
receiving a user's operation to move one or more of the plurality of objects from the first area to the second area;
judging whether there is incidental data corresponding to the items of the incidental data of the objects set in the second area in the incidental data of the object(s) moved by the user's operation;
cancelling the user's operation and displaying the object(s) moved by the user's operation not in the second area but in the first area together with objects not moved by the user's operation, in a case where it is judged in said judging step that there is no incidental data corresponding to the items of the incidental data of the objects set in the second area in the incidental data of the object(s) moved by the user's operation;
determining one or more objects, among the objects displayed in the first area, whose incidental data corresponding to the items of the incidental data of the objects set in the second area matches the incidental data of the object(s) moved by the user's operation, in a case where it is judged in said judging step that there is incidental data corresponding to the items of the incidental data of the objects set in the second area in the incidental data of the object(s) moved by the user's operation; and
moving the object(s) determined in said determining step to the second area and display the object(s) in the second area, and displaying objects that are not determined in said determining step in the first area.

4. A computer-readable storage medium storing a control program to cause a computer to execute a control method for an information processing apparatus, the control method comprising the steps of:
displaying, on a display unit, a plurality of objects, a first area and a second area, wherein the plurality of objects is displayed in the first area and information indicating items of incidental data of the objects is displayed in the second area;
receiving a user's operation to move one or more of the plurality of objects from the first area to the second area;
judging whether there is incidental data corresponding to the items of the incidental data of the objects set in the second area in the incidental data of the object(s) moved by the user's operation;
cancelling the user's operation and displaying the object(s) moved by the user's operation not in the second area but in the first area together with objects not moved by the user's operation, in a case where it is judged in said judging step that there is no incidental data corresponding to the items of the incidental data of the objects set in the second area in the incidental data of the object(s) moved by the user's operation;

determining one or more objects, among the objects displayed in the first area, whose incidental data corresponding to the items of the incidental data of the objects set in the second area matches the incidental data of the object(s) moved by the user's operation, in a case where it is judged in said judging step that there is incidental data corresponding to the items of the incidental data of the objects set in the second area in the incidental data of the object(s) moved by the user's operation; and moving the object(s) determined in said determining step to the second area and display the object(s) in the second area, and to display objects that are not determined in said determining step in the first area.

\* \* \* \* \*